(12) United States Patent
Gratz

(10) Patent No.: US 6,517,652 B1
(45) Date of Patent: Feb. 11, 2003

(54) METHOD AND DEVICE FOR FRICTION WELDING OF A THERMOPLASTIC STRIP

(75) Inventor: Michael Gratz, Whitby (CA)

(73) Assignee: Maschinenfabrik Gerd Mosca AG, Waldbrunn (DE)

( * ) Notice: Subject to any disclaimer, the term of this patent is extended or adjusted under 35 U.S.C. 154(b) by 141 days.

(21) Appl. No.: 09/722,855

(22) Filed: Nov. 27, 2000

(30) Foreign Application Priority Data

May 16, 2000 (DE) ......................................... 100 24 049

(51) Int. Cl.⁷ .............................................. B29C 65/06
(52) U.S. Cl. ...................... 156/73.5; 156/229; 156/494; 156/580
(58) Field of Search ............................... 156/73.5, 157, 156/159, 229, 494, 502, 580, 581; 100/29, 32, 33 PB

(56) References Cited

U.S. PATENT DOCUMENTS

| | | | |
|---|---|---|---|
| 3,674,972 A | * | 7/1972 | Stahnke ...................... 219/56 |
| 5,141,591 A | * | 8/1992 | Boek et al. .................. 156/502 |
| 5,306,383 A | | 4/1994 | Kobiella ..................... 156/468 |
| 5,542,239 A | * | 8/1996 | Fujii et al. .................... 53/477 |
| 5,942,061 A | * | 8/1999 | Figiel et al. ................. 156/73.5 |
| 5,954,899 A | * | 9/1999 | Fiegel et al. ................ 156/73.5 |
| 6,003,578 A | * | 12/1999 | Chang ......................... 156/494 |

FOREIGN PATENT DOCUMENTS

EP    0 564 189 A1    10/1993

* cited by examiner

Primary Examiner—James Sells
(74) Attorney, Agent, or Firm—Choate, Hall & Stewart

(57) ABSTRACT

Disclosed is a method for connecting at least two thermoplastic elements. The elements are pressed together and welded elements whereby at least two welds are produced. This method may be used for friction welding of two overlapping sections of a thermoplastic strip. Also disclosed is a system for wrapping the strip around a package. The strip is passed around the package to form a loop whereby the sections are arranged at each end of the loop. The strip is tightened and secured by at least one clamping plate of the system. The strip is pressed against an abutment plate of the system pressing the overlapping sections together by a vibrating plate of the system. The overlapping sections are pressed against the abutment plate by the vibrating plate welding the overlapping sections by the vibrating plate whereby at least two welds are A produced one behind each other in longitudinal direction of the strip and separated from one another by an unwelded area of the strip. A device welds at least two thermoplastic elements by a vibrating plate whereby at least two welds are produced one behind each other in longitudinal direction of one of the elements and separated from one another by an unwelded area of the element.

34 Claims, 3 Drawing Sheets

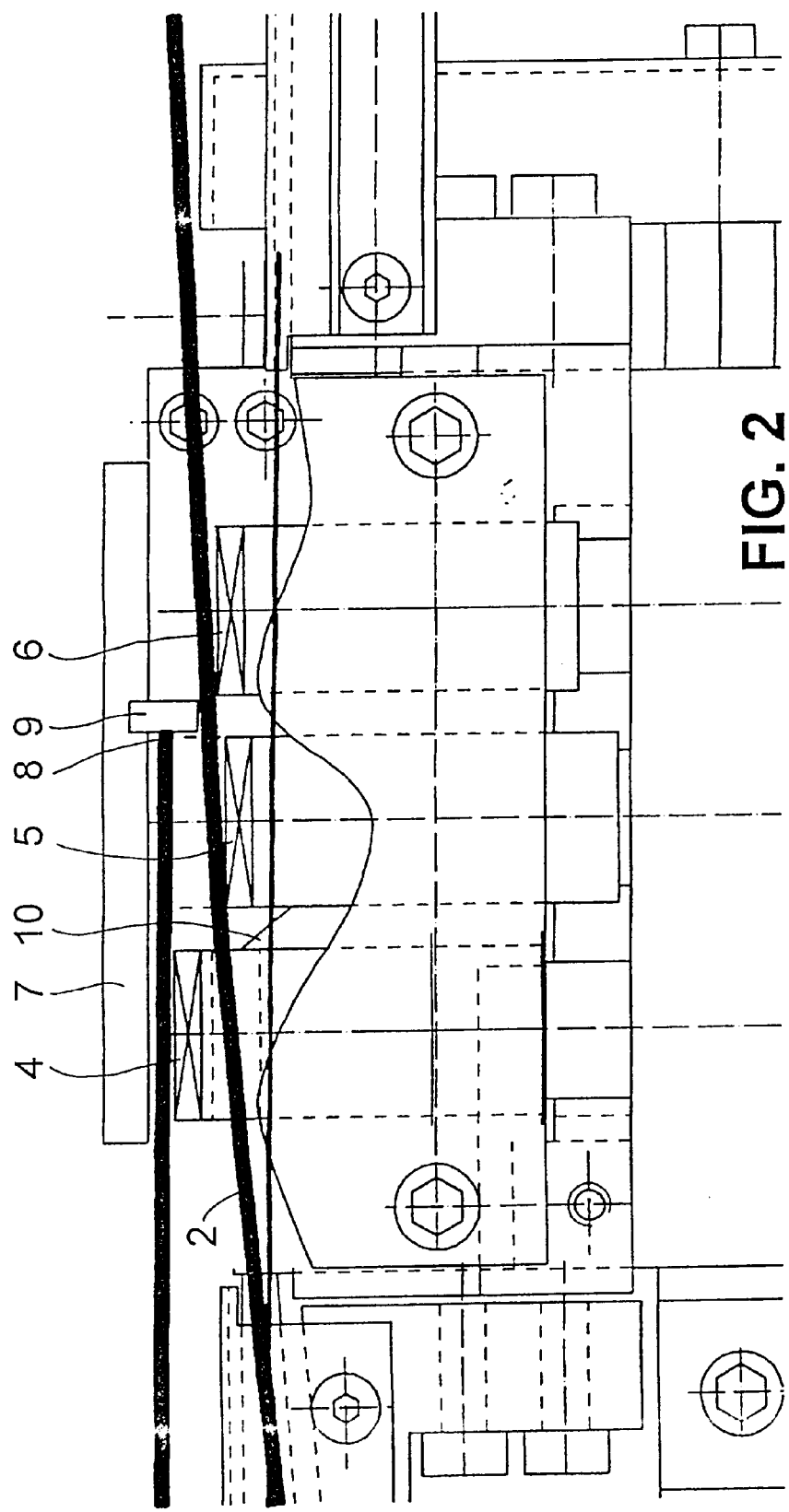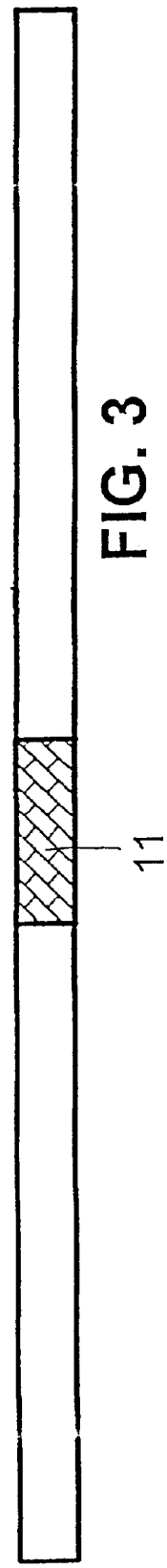
FIG. 2
FIG. 3

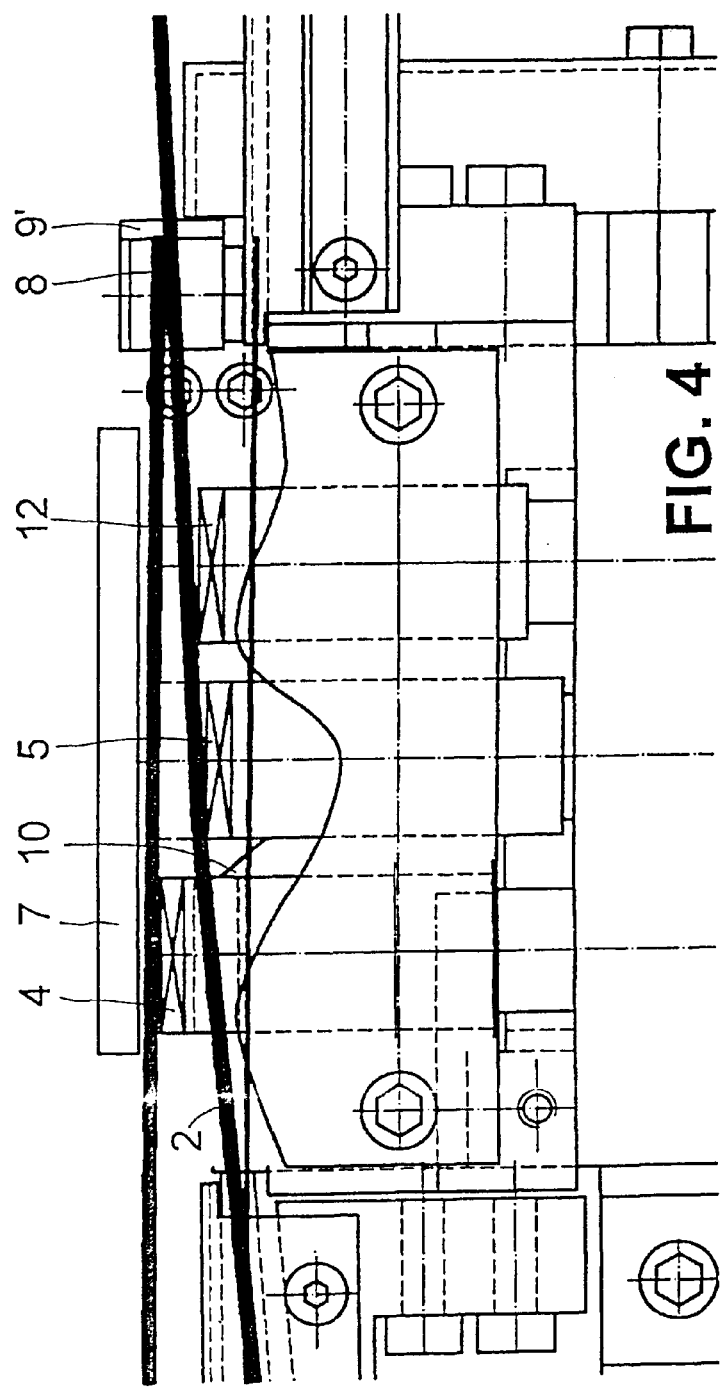

METHOD AND DEVICE FOR FRICTION WELDING OF A THERMOPLASTIC STRIP

BACKGROUND OF THE INVENTION

1. Field of the Invention

The present invention relates to a method and a device of friction welding of two thermoplastic elements, and more particularly to the field of friction welding of overlapping sections of a thermoplastic strip.

2. Description of Related Art

German Patent No. 44 22 147 C2 describes a device suitable for carrying out a method, whereby a strip is first passed around a package to form a loop and tightened, and then secured by at least one clamping plate pressing the strip against an abutment plate. Overlapping sections are pressed against one another and against an abutment plate by a vibrating plate driven by a vibrating drive and thus welded together. The connecting device has two clamping plates. The first of the clamping plates presses the free end section against an abutment plate after the loop has been formed, and thus securing it. The second of these two plates secures the initial section of the loop, which is still connected to the strip supply, by pressing it against an abutment plate after the strip is tightened by a tension drive. The initial section is then cut from the strip supply. The two overlapping strip sections are superimposed between the clamping plates and a vibrating plate arranged between the clamping plates pressing the two strip sections against one another and against an abutment plate. Due to the vibrating movements of the vibrating plate, heat generated by friction between the strip sections is sufficient to melt and weld the two strip sections together.

This known joining method has proven successful in practical use. However, it has some weaknesses that can lead to an inadequate bond between the two sections of strip. Since the two clamping plates are provided only for clamping one of the two strip sections, the end stop for the free end of the strip forming the loop is provided between the clamping plate for the initial section of the strip and the vibrating plate. The distance between the end stop and the vibrating plate is only a few millimeters. Since the end of the strip made of elastic plastic moves at a high speed against the end stop, a certain rebounding of the end of the strip can be observed. In an unfavorable case, the free end of the strip may rebound several millimeters, so that it rests in the area of the weld to be produced by the vibrating plate when the end section of the strip is secured by the first clamping plate. This reduces the length of the resulting weld. This reduction in length of the weld can lead to an unacceptable weakening of the joint. Thus, there is the risk of opening of the loop of strip surrounding the package under tension.

Thus, it may be advantagous and desirous to increase the reliability and stability of the welds.

SUMMARY OF THE INVENTION

The reliability and stability of the welds may be increased according to the invention by producing at least two separate welds one behind the other in the longitudinal direction of the strip, separated by an unwelded area. According to the invention a device for friction welding has incorporated means for producing such welds.

The reliability of the joint is greatly increased by producing multiple welds. Although each individual weld has approximately only the same strength as the weld known from the related art cited above, the tensile force from each end of the loop is applied only to the adjacent weld. If there are more than two welds, essentially the two outer welds absorb the tensile force. The stress on the two stressed welds is reduced approximately in half in comparison with the individual weld from the related art. If one weld is nevertheless destroyed by the tension forces, cohesion of the two strip sections is nevertheless ensured by at least one remaining weld which is still fully functional.

The proposed method of producing at least two welds separated by an unwelded area also has some major advantages in comparison with simple extension of one weld. The welds produce the highest holding force in their edge areas. As soon as a first tear has begun at one edge area of a weld, only a relatively small force need be applied for a progressive tear to result in the weld in the plane between the strip sections and thus a complete separation of the two strip sections from one another. Due to the arrangement of at least two welds separated by an unwelded area, at least one separate weld is thus created which is fully functional in the event of failure of the first weld. Paring of the first weld cannot propagate into the second weld because of their spatial separation.

An embodiment of the invention may also include more than two welds. In order to produce a sufficiently secure joint with the least possible effort and the lowest cost, two welds seem to be an optimum number in practice.

In the simplest case, the two welds may be produced by having an interruption of several millimeters in length at the center of the surface of the vibrating plate between the two clamping plates. In the area of this interruption, no compressive force is produced perpendicular to the plane of the strip, so that no welding takes place here. The two welds may be produced by two vibrating plates arranged with a distance between them. These vibrating plates can preferably be pressed independently of one another against the strip sections to be welded.

In accordance with another aspect the invention is a method for friction welding of two overlapping sections of a thermoplastic strip with a system wrapping the strip around a package. According to this method, the strip is passed around the package to form a loop whereby sections are arranged at each end of the loop. The strip is then tightened and secured by at least one clamping plate of the system in which the strip is pressed against an abutment plate of the system. Moreover, the overlapping sections are pressed together by and against the abutment plate by a vibrating plate of the system. With vibration caused by the vibrating plate, the overlapping sections are welded whereby at least two welds are produced one behind each other in longitudinal direction of the strip and separated from one another by an unwelded area of the strip.

The two vibrating plates may be arranged with a distance between them and are pressed against the strip to produce the welds.

In one embodiment of the method according to the present invention, before forming the loop, the free end of the strip is first conveyed consecutively past a first vibrating plate and a combined clamping and vibrating plate in the direction of feed, and to a strip guidance device (strip guiding frame) which guides the strip in the form of a loop around the package. After forming the loop, the free end of the strip is conveyed past a first clamping plate, past the above-mentioned vibrating plate arranged next to the first clamping plate and past the combined clamping and vibrating plate next to it, coming to rest at an end stop. Thus, after forming the loop, the free end of the strip moves between the abutment plate and the plates covered by the initial section which is connected to the strip supply, namely the first vibrating plate and the combined clamping and vibrating plate. A strip detection signal is delivered when the strip comes in contact with an end stop. This signal causes the above-mentioned first clamping plate to move toward the abutment plate in the direction perpendicular to the plane of the strip, so that the end section of the strip is clamped between the surfaces of the first clamping plate and the abutment plate. The loop is then tightened around the package by a tension force acting against the original direction of feed and is secured by the combined clamping and vibrating plate in combination with the abutment plate, with the two overlapping strip sections being clamped between the combined clamping and vibrating plate and the abutment plate.

After securing the initial section of the loop which is still connected to the strip supply, this section may be cut off close to the first clamping plate. The first vibrating plate, which is located between the first clamping plate and the combined clamping and vibrating plate, is pressed against both strip sections and against the abutment plate. Both the combined clamping and vibrating plate and the first vibrating plate are set in vibration, so that the welds are formed.

When working according to this method, the number of moving parts is not increased in comparison with the device known from the related art to produce a weld. The second clamping plate in the direction of feed is provided with the additional function of a welding device merely by connecting it to a vibrating drive. To weld the two sections of strip, the second clamping plate in the direction of feed must clamp both sections of strip, i.e., both the initial section and the end section of the loop. This yields the additional advantage that after forming the loop, the free end of the strip can be guided to an end stop located far downstream from the second clamping/vibrating plate rather than between a clamping plate and a vibrating plate. The end stop may be 40 mm, for example, away from the clamping and vibrating plate, so that even with considerable rebounding of the end of the strip, the weld produced by the clamping/welding plate may be prevented from being shortened unacceptably.

In one embodiment, both the vibrating plate and the clamping/welding plate may be connected to the same vibrating drive. This vibrating drive may move the two plates crosswise to the longitudinal direction of the strip. Since the vibrating movements run in the transverse direction, the borders and edges of the welds are not blurred by the vibration and can be formed in a well-defined manner. This reduces the danger of the edges of the welds running into one another and linking the welds together.

In accordance with yet a further aspect the invention is a method for packing a package with a packing system, whereby a thermoplastic strip is wrapped and passed around the package. The strip is then tightened and secured by at least one clamping plate of the system, pressing the strip against an abutment plate of the system. Moreover, two overlapping sections of the strip are pressed together by at least one vibrating plate of said packing system. Additionally, overlapping sections are pressed against the abutment plate by the at least one vibrating plate. The overlapping sections are connected by friction welding by the at least one vibrating plate whereby at least two welds are produced one behind each other in longitudinal direction of said strip and separated from one another by an unwelded area of the strip.

In accordance with another aspect of the invention is a device for friction welding of two overlapping sections of a thermoplastic strip. The device includes at least one clamping plate, an abutment plate working together with the clamping plate for securing the sections, a first vibrating plate which presses the sections against one another in an overlap area and against the abutment plate to produce a first weld, and a second vibrating plate arranged at a distance from the first vibrating plate. The second vibrating plate presses the sections together in the overlap area and against the abutment plate to produce at least one second weld. This device may also be used for carrying out the above-mentioned methods. Preferably, the distance between the first vibrating plate and the second vibrating plate is at least 5 mm, especially about 10 mm.

One embodiment of the device for friction welding of the overlapping sections of the thermoplastic strip further comprises at least one vibrating drive connected to at least one of the vibrating plates for driving the at least one vibrating plate, preferably for moving the at least one vibrating plate in the transverse direction of the strip. Moreover, the vibrating plates may be connected to one single vibrating drive.

The above-mentioned device may also comprise a first clamping plate driven by a clamping drive pressing the clamping plate against a first of the sections resting on the abutment plate. A second clamping plate is driven by a clamping drive pressing the second clamping plate against a second of the sections supported by the abutment plate. At least one of the vibrating plates is arranged between the first and second clamping plates. In one arrangement, the second clamping plate may be connected to a vibrating drive to form a combined clamping and vibrating plate. Moreover, the clamping plate and the vibrating plates may be supported against one single abutment plate.

In one further embodiment of the device, the abutment plate, the clamping plate and the vibrating plate may have surfaces which are structured and provided with pointed teeth.

The invention relates also to a device for packing a package, comprising means for wrapping and for passing a thermoplastic strip around said package. The strip has two overlapping sections, means for tightening the strip, at least one clamping plate, an abutment plate against which the strip is pressed by said at least one clamping plate for securing said strip, a first vibrating plate which presses said sections against one another in an overlap area and against the abutment plate to produce a first weld, and a second vibrating plate arranged at a distance from the first vibrating plate. The second vibrating plate presses the sections together in the overlap area and against the abutment plate to produce at least one second weld. This device may also be used for carrying out the above-mentioned methods.

In one embodiment of that device according to the invention, the distance between the first vibrating plate and the second vibrating plate is at least 5 mm, preferably about 10 mm. Moreover, the device may further comprise at least one vibrating drive connected to at least one of the vibrating plates for driving the at least one vibrating plate, preferably for moving the at least one vibrating plate in the transverse direction of the strip. The vibrating plate may be connected to one single vibrating drive.

In another embodiment of the invention, the device further comprises a first clamping plate driven by a clamping drive pressing the clamping plate against a first of the sections which rests on the abutment plate and is wrapped around the package and guided up to an end stop. The device also includes means for passing the strip around the package for forming a loop, a tension drive for tightening the loop formed by the strip, a second clamping plate driven by a clamping drive pressing the second clamping plate against a second of said sections supported by the abutment plate. At least one of the vibrating plates is arranged between the first and second clamping plates. The first section may be an end section of the loop. The second section may be an initial section of the loop.

The two clamping plates may be arranged so that one of them secures the free end section while the other secures the initial section of the loop which is connected to a strip supply before the initial section is severed from the strip supply. In this embodiment, two vibrating plates are provided in the area of the strip overlap between the two clamping plates.

As an alternative, the end stop may be located downstream from the second clamping plate, so that it presses the initial section and the end section of the strip loop against the abutment plate. In this embodiment, the second clamping plate is connected to a vibrating drive to form a combined clamping and vibrating plate. Moreover, the clamping plate and the vibrating plates may be supported against one abutment plate.

In one further embodiment of the above-mentioned device, the abutment plate, the clamping plate and the vibrating plate each comprise a surface facing the strip which is structured and provided with pointed teeth.

One further aspect of the invention is a device for connecting at least two thermoplastic elements, comprising clamping means for clamping the elements, abutment means working together with the clamping means for securing the elements, a first vibrating element for friction welding of the elements. The first vibrating element presses the thermoplastic elements against one another and against the abutment means to produce a first weld, and a second vibrating element for friction welding of the elements. The second vibrating element is arranged at a distance from the first vibrating element and presses the thermoplastic element together and against the abutment means to produce at least a second weld.

BRIEF DESCRIPTION OF DRAWINGS

Features and advantages of the present invention will become more apparent from the following detailed description of exemplary embodiments thereof taken in conjunction with the accompanying drawings in which:

FIG. 2 illustrates an example of a partially cutaway side view of a friction welding device according to related art;

FIG. 3 illustrate a top view of a strip welded with a device according to FIG. 2;

FIG. 4 illustrates shows a partially cutaway side view of a friction welding device forming a part of the device from FIG. 1; and FIG. 5 illustrates a top view of a strip welded with the device from FIG. 4.

DETAILED DESCRIPTION OF THE INVENTION

Figure 1:
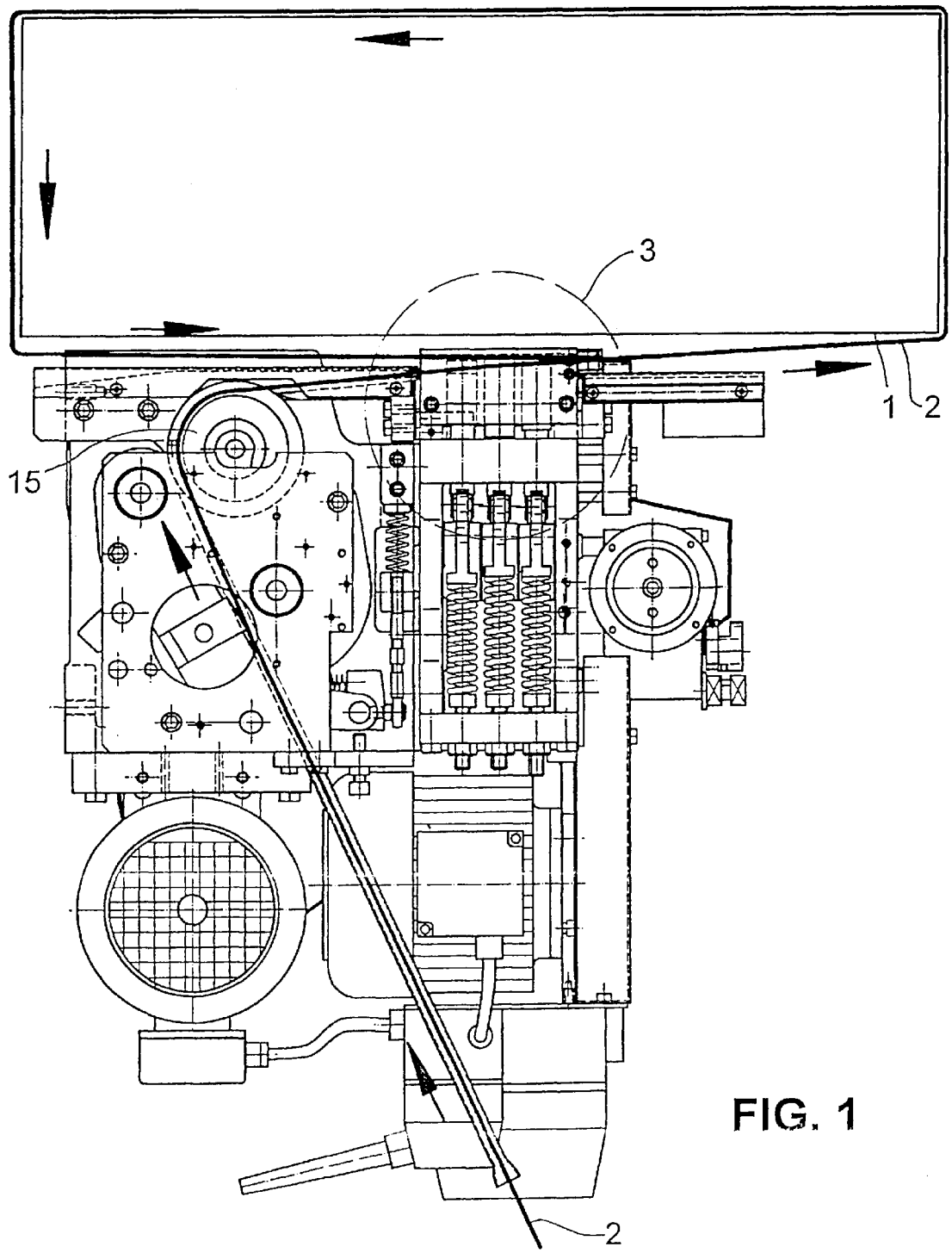
FIG. 1 is an example of a side view of a device according to the present invention.

Referring to FIG. 1, shown is an example of a system for wrapping a strip 2 around a package 1. In this embodiment, strip 2 may be pulled from a strip supply (not shown) and conveyed upward in the direction of the arrow. A deflection roller 15 may deflect strip 2 into an approximately horizontal direction. Strip 2 may then be conveyed through a welding device 3 of the device to a strip guidance device (not shown) which guides strip 2 around package 1 in the direction of the arrows. After forming a loop around package 1, the free end of the strip may be guided again into the area of welding device 3 and move against an end stop. The free end of the strip may then be secured, and strip 2 is put under tension against its direction of feed, i.e., against the direction of the arrows. On reaching the required tension, the initial section of strip 2 forming the loop, which is connected to the strip supply, may be secured and severed from the strip supply. The overlapping sections of strip 2 may be welded in welding device 3.

FIG. 2 illustrates an example of a welding device according to the related art, for example, approximately corresponding to the device as disclosed in German Patent No. 44 22 147 C2. Strip 2 first moves through behind a first clamping plate 4 and in front of the surfaces of a vibrating plate 5 and a second clamping plate 6, each opposite a common abutment plate 7. It is inserted into a strip guidance device and the loop around the package is formed (see FIG. 1). After forming the loop, free end 8 of the strip is guided along the surface of abutment plate 7 and against an end stop 9. A signal is delivered when the strip comes in contact with end stop 9, causing first clamping plate 4 to clamp the end section of strip 2 together with abutment plate 7, as illustrated in FIG. 2. Then the initial section of strip 2, which is connected to the strip supply, can be pulled back by a tension drive against the direction of feed and the loop tightened around the package. After tightening, second clamping plate 6 presses the initial section of the strip against the abutment plate. End stop 9 between strip 2 and abutment plate 7 has been removed previously. A blade 10 close to the first clamping plate severs the initial section of strip 2 from the strip supply. Vibrating plate 5 presses the initial section of strip 2 against the end section of strip 2, which is supported against abutment plate 7. Vibrating movements are induced in vibrating plate 5 by a vibrating drive (not shown), thus generating friction heat between the initial section and the end section of the strip, leading to melting of the strip sections and thus welding. Weld 11 produced in this way may be seen, for example, in FIG. 3.

As shown in FIG. 2, end stop 9 is close to vibrating plate 5 downstream from it in the direction of feed. Since free end 8 of strip 2 strikes against end stop 9 at a high speed, there is the risk that it might rebound into the area of vibrating plate 5. This may reduce the length of weld 11 and decrease its maximum strength.

Referring to FIG. 4, shown is an embodiment of a device for producing a more reliable weld in comparison to the device of FIG. 2. One difference is that end stop 9' for free end 8 of the strip is arranged beyond abutment plate 7 in the direction of feed. Furthermore, the second clamping plate has been replaced by a clamping and vibrating plate 12 which is connected to a vibrating drive like middle vibrating plate 5. Displaced end stop 9' is arranged at a considerable distance (up to 40 mm) from the end of clamping and vibrating plate 12. The sequence of motions of insertion and welding of the strip corresponds to the sequence of motions of the device from FIG. 2. Strip 2 pulled off from the strip supply is passed through behind first clamping plate 4 and in front of vibrating plate 5 and clamping and vibrating plate 12 to be passed around the package in the form of a loop in a strip guidance device. At the end of the path of motion, free end 8 of the strip runs in front of first clamping plate 4 and between the strip section connected to the strip supply and abutment plate 7 on vibrating plate 5 and clamping and vibrating plate 12. When the end of the strip comes to rest against end stop 9, the first clamping plate 4 moves against abutment plate 7 at a right angle to the plane of the strip. This causes the free end of the strip to be clamped.

The strip is pulled back and tightened. Subsequently clamping and vibrating plate 12 clamps both the initial section of strip 2 and the end section of strip 2. The strip is severed from the strip supply close to first clamping plate 4 by blade 10. Vibrating plate 5 also moves upward, so that it presses the initial section of strip 2 as well as the end section of the strip together and against abutment plate 7.

Vibration is induced in both vibrating plate 5 and clamping and vibrating plate 12 by the same vibrating drive (not shown). The resulting frictional heat produces both welds 13, 14 illustrated in FIG. 5. Each individual weld 13, 14 has approximately a strength corresponding to the strength of weld 11 from FIG. 3, which was produced according to the related art. Since tensile forces are directed from both ends of the strip into the adjacent weld in each case, the tensile forces are divided evenly between two welds 13 and 14 in welding according to FIG. 5. This reduces the stress on the individual welds and increases the safety of the strip against destruction of the weld. Furthermore, if one of the two welds is defective or destroyed, a fully functional second weld is still available to secure the joint.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for friction welding of two overlapping sections of a thermoplastic strip with a system wrapping said thermoplastic strip around a package, comprising:

passing said thermoplastic strip around said package to form a loop whereby said two overlapping sections are arranged at each end of said loop;

tightening said thermoplastic strip;

securing said thermoplastic strip by at least one combined clamping and vibrating plate of said system such that said thermoplastic strip is pressed against an abutment plate of said system;

pressing said two overlapping sections together by said at least one combined clamping and vibrating plate;

pressing said two overlapping sections against said abutment plate by said at least one combined clamping and vibrating plate; and welding said overlapping sections by vibrating said at least one combined clamping and vibrating plate.

2. The method according to claim 1, further comprising:

providing at least one separate vibrating plate;

pressing said combined clamping and vibrating plate and said separate vibrating plate against said thermoplastic strip to produce at least one weld, said plates being arranged with a distance between them.

3. The method according to claim 2, wherein said at least one clamping and vibrating plate and said at least one separate vibrating plate are driven by one vibrating drive.

4. The method according claim 2, further comprising:

inducing vibration in said plates by a vibrating drive of the system in the transverse direction of said thermoplastic strip.

5. The method according to claim 1, further comprising:

conveying a free end of said thermoplastic strip before forming said loop to a strip guidance device of said system, passing in succession in the direction of feed said at least one separate vibrating plate and said at least one combined clamping and vibrating plate;

after forming said loop, conveying said free end of said thermoplastic strip toward an end stop, passing in succession in the direction of feed a first clamping plate as well as said at least one separate vibrating plate and said at least one combined clamping and vibrating plate, both of which are covered by an initial section of the thermoplastic strip forming the loop and being connected to a strip supply;

before tightening said thermoplastic strip, pressing said free end section of the thermoplastic strip forming said loop against said abutment plate by said first clamping plate and thus securing said free end section;

after tightening, pressing said initial section of said thermoplastic strip forming said loop together with a free end section against said abutment plate by said at least one combined clamping and vibrating plate and cutting off said initial section near said first clamping plate;

pressing said at least one separate vibrating plate between said first clamping plate and said at least one combined clamping and vibrating plate against said two overlapping strip sections resting on said abutment plate; and inducing vibration in said at least one clamping and vibrating plate and said at least one separate vibrating plate by a vibrating drive of said system to produce said at least one weld.

6. A method for packing a package with a packing system, comprising:

wrapping and passing a thermoplastic strip around said package;

tightening said thermoplastic strip;

securing said thermoplastic strip by at least one combined clamping and vibrating plate of said system, pressing said thermoplastic strip against an abutment plate of said packing system;

pressing said two overlapping sections of said thermoplastic strip together by said at least one combined clamping and vibrating plate;

pressing said two overlapping sections against said abutment plate by said at least one combined clamping and vibrating plate; and welding said overlapping sections with friction welding by said at least one combined clamping and vibrating plate.

7. A device for friction welding of two overlapping sections of a thermoplastic strip, comprising:

at least one combined clamping and vibrating plate; and an abutment plate working together with said at least one combined clamping and vibrating plate for securing said two overlapping sections, wherein said at least one combined clamping and vibrating plate presses said two overlapping sections against one another in an overlap area and against said abutment plate to produce at least one weld.

8. The device of claim 7, further comprising:

at least one separate vibrating plate arranged at a distance from said at least one combined clamping and vibrating plate.

9. The device according to claim 8, wherein the distance between the at least one combined clamping and vibrating plate and the at least one separate vibrating plate is at least 5 mm.

10. The device according to claim 9, wherein the distance between the at least one combined clamping and vibrating plate and the at least one separate vibrating plate is about 10 mm.

11. The device according to claim 7, further comprising at least one vibrating drive connected to at said at least one combined clamping and vibrating plate for moving said at least one combined clamping and vibrating plate.

12. The device according to claim 8, wherein said at least one combined clamping and vibrating plate and said at least one separate vibrating plate are connected to one vibrating drive.

13. The device according to claim 10, wherein said at least one vibrating drive moves said at least one combined clamping and vibrating plate in the transverse direction of said thermoplastic strip.

14. The device according to claim 7, further comprising:
a first clamping plate driven by a clamping drive pressing said clamping plate against a first of said two overlapping sections resting on said abutment plate;
a second clamping plate driven by a clamping drive pressing said second clamping plate against a second of said two overlapping sections supported by said abutment plate, wherein said at least one combined clamping and vibrating plate is arranged between said first and second clamping plates.

15. The device according to claim 7, wherein said at least one combined clamping and vibrating plate is supported against one abutment plate.

16. The device according to claim 7, wherein a surface of said abutment plate facing said thermoplastic strip is structured and provided with pointed teeth.

17. The device according to claim 7, wherein a surface of said at least one combined clamping and vibrating plate facing said thermoplastic strip is structured and provided with pointed teeth.

18. The device according to claim 8, wherein a surface of said at least one separate vibrating plate facing said thermoplastic strip is structured and provided with pointed teeth.

19. The device according to claim 18, further comprising:
a first clamping plate driven by a clamping drive pressing said clamping plate against a first of said two overlapping sections which rests on said abutment plate and is wrapped around said package and guided up to an end stop;
means for passing said thermoplastic strip around said package for forming a loop;
a tension drive for tightening said loop formed by said thermoplastic strip;
a second clamping plate driven by a clamping drive pressing said second clamping plate against a second of said two overlapping sections supported by said abutment plate, wherein said at least one combined clamping and vibrating plate and said at least one separate vibrating plate are arranged between said first and second clamping plates.

20. The device according to claim 19, wherein the first overlapping section is an end of said loop, and the second overlapping section is an initial of said loop.

21. The device according to claim 19, wherein said end stop is located downstream from the second clamping plate, so that said second clamping plate presses said initial and said end of said loop against said abutment plate, said second clamping plate is connected to a vibrating drive to form said at least one combined clamping and vibrating plate.

22. A device for packing a package, comprising:
means for wrapping and for passing a thermoplastic strip around said package, said thermoplastic strip having two overlapping sections;
means for tightening said thermoplastic strip;
at least one combined clamping and vibrating plate;
an abutment plate against which said thermoplastic strip is pressed by said at least one combined clamping and vibrating plate for securing said thermoplastic strip, wherein said at least one combined clamping and vibrating plate presses said two overlapping sections against one another in an overlap area and against said abutment plate to produce at least one weld.

23. The device of claim 22, further comprising:
at least one separate vibrating plate arranged at a distance from said at least one combined clamping and vibrating plate.

24. The device according to claim 23, wherein the distance between said at least one combined clamping and vibrating plate and said at least one separate vibrating plate is at least 5 mm.

25. The device according to claim 24, wherein the distance between said at least one combined clamping and vibrating plate and said at least one separate vibrating plate is about 10 mm.

26. The device according to claim 22, further comprising at least one vibrating drive connected to said at least one combined clamping and vibrating plate for driving said at least one combined clamping and vibrating plate.

27. The device according to claim 26, wherein said at least one vibrating drive moves said at least one combined clamping and vibrating plate in the transverse direction of said thermoplastic strip.

28. The device according to claim 23, wherein said at least one combined clamping and vibrating plate and said at least one separate vibrating plate are connected to one vibrating drive.

29. The device according to claim 22, wherein said at least one combined clamping and vibrating plate is supported against one abutment plate.

30. The device according to claim 22, wherein a surface of said abutment plate facing said thermoplastic strip is structured and provided with pointed teeth.

31. The device according to claim 22, wherein a surface of said at least one combined clamping and vibrating plate facing said thermoplastic strip is structured and provided with pointed teeth.

32. The device according to claim 23, wherein a surface of said at least one separate vibrating plate facing said thermoplastic strip is structured and provided with pointed teeth.

33. A device for connecting at least two thermoplastic elements, comprising:
combined clamping and vibrating means for clamping said at least two thermoplastic elements;
abutment means working together with said combined clamping and vibrating means for securing said at least two thermoplastic elements, wherein said combined clamping and vibrating means presses said at least two thermoplastic elements against one another and against the said abutment means to produce a first weld.

34. The device of claim 33, further comprising:
at least one separate vibrating means arranged at a distance from said at least one combined clamping and vibrating means.

* * * * *